United States Patent [19]

Pompei et al.

[11] 4,050,208
[45] Sept. 27, 1977

[54] AIRCRAFT INTERIOR CEILING PANEL ASSEMBLY AND ATTACHMENT APPARATUS

[75] Inventors: Arturo Pompei, Rome, Italy; Alden Bernard Winters, Seattle, Wash.

[73] Assignee: The Boeing Company, Seattle, Wash.

[21] Appl. No.: 729,438

[22] Filed: Oct. 4, 1976

[51] Int. Cl.² .......................... E04C 1/28; B64C 1/00
[52] U.S. Cl. ............................. 52/460; 244/119
[58] Field of Search ...................... 52/459–472; 244/119

[56] References Cited

U.S. PATENT DOCUMENTS

| 3,327,443 | 6/1967 | Gay et al. | 52/460 |
| 3,341,999 | 9/1967 | Berg | 52/460 |
| 3,417,528 | 12/1968 | Hallock | 52/463 |
| 3,600,016 | 8/1971 | Dilley | 244/119 X |

Primary Examiner—J. Karl Bell
Attorney, Agent, or Firm—Al Richardson; Bernard A. Donahue

[57] ABSTRACT

An interior wall and ceiling panel for use in the cabin of a passenger aircraft which includes attachment brackets, a support bracket assembly having three degees of adjustability for mounting the panels to the airframe and a gap cover extending between adjoining panels and to provide a finished appearance when viewed from the interior of the cabin.

8 Claims, 8 Drawing Figures

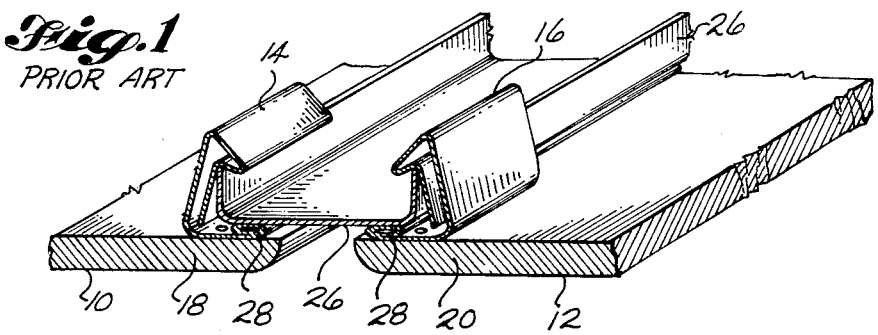
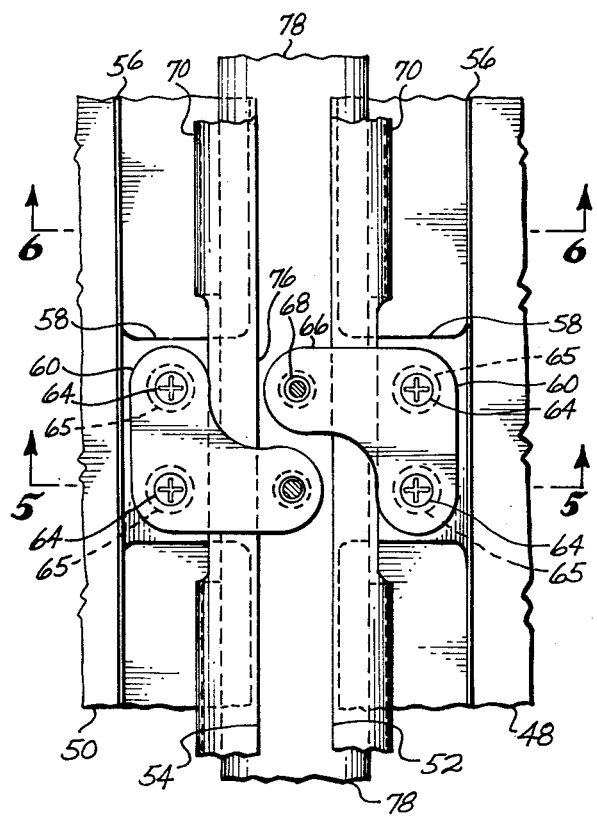
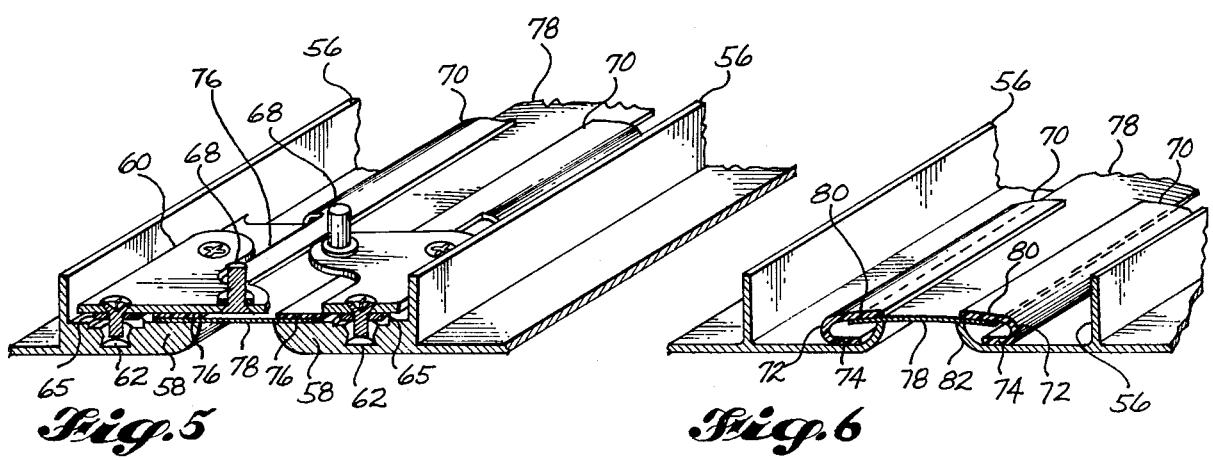

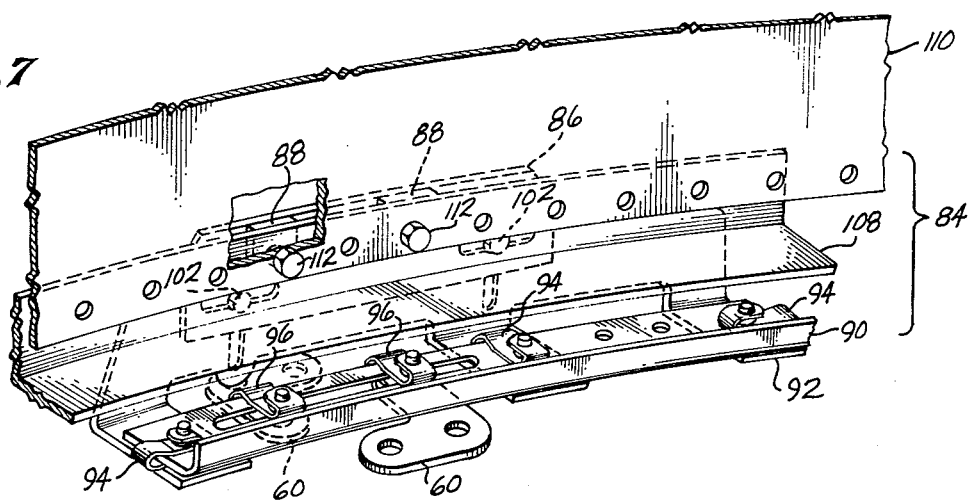
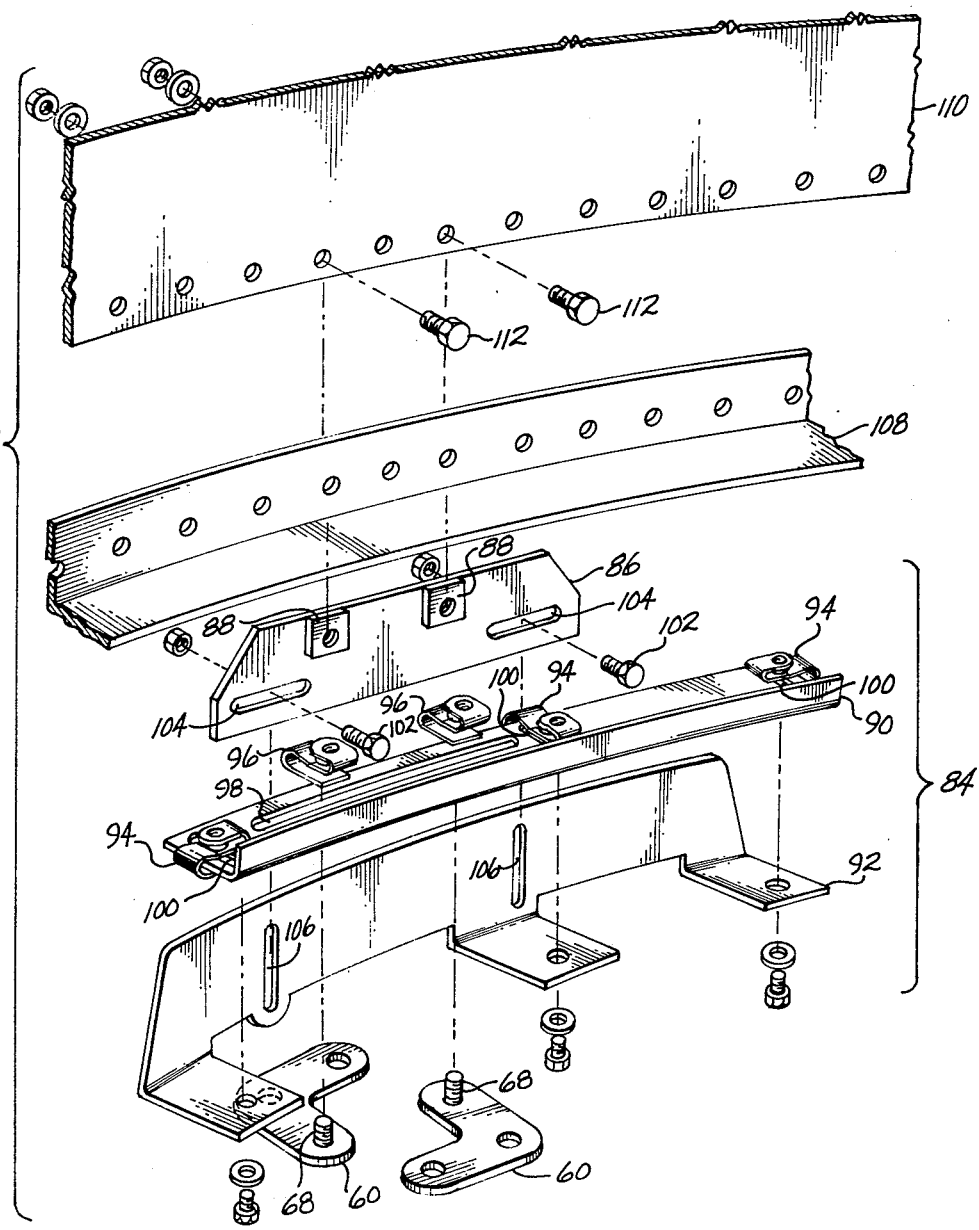

AIRCRAFT INTERIOR CEILING PANEL ASSEMBLY AND ATTACHMENT APPARATUS

BACKGROUND OF THE INVENTION

This invention relates generally to a ceiling panel assembly and more specifically to a novel combination which includes a plurality of ceiling panels, mounting brackets, guides, and gap covers for use in the interior of a passenger aircraft.

It is common to install a false ceiling in the cabin of a passenger aircraft to provide an attractive, finished appearance and insulate the cabin against noise, dust, and heat loss. Typically, the ceilings are composed of a number of abutting panel sections made of plastic or fiberglass honeycomb which are attached in some manner to the interior of the aircraft fuselage structure with clips or some other sort of retainer. FIG. 1 shows a cut-away view of a portion of one such ceiling panel assembly which is currently in use and is considered prior art. This view is taken in the area between two adjacent panels, 10 and 12, and near the location of retaining clips 14 and 16. The panels are made as thin as possible to minimize weight and are typically ¼ inch thick.

The supporting structure for the panels consists of a number of arc-shaped channel sections 26 commonly called "whalebones" which extend circumferentially around the fuselage and are mounted to the interior side of the fuselage frames. Each of the panels is nominally rectangular in shape and is curved to achieve the desired ceiling contour. The width of the various panel sections is determined by the frame spacing, and their length in the circumferential direction around the fuselage is chosen to provide convenience in handling and installation of the panels.

Each panel is attached along two opposing edges to two successive whalebones by means of a number of clips, similar to clips 14 and 16. A seal between the whalebone and the panel is provided by bulb seal 28 which is attached to the panel parallel to its edge as shown. The other pair of opposing edges is not attached to supporting structure but is butted up against the edges of circumferentially adjacent panels. Abutting panel edges may be sealed by using an ordinary tongue-in-groove joint or some other sort of interlocking construction.

While the above described ceiling assembly has been used extensively, it has exhibited a number of undesirable features. For example, it is sometimes difficult to clip a panel to the whalebone because of the flexibility of the whalebone itself. It is necessarily made thin and light to minimize weight and is rather easily pushed backwards by the panel during installation. Also, the clips do not always hook the whalebone securely because of variations in the whalebone's cross section. Sometimes it is necessary to deform the clip in order to attach the panel.

Problems have also been encountered in fitting the whalebone to the frames. The whalebone is formed as a cylindrical unit to minimize manufacturing expense, but the contour of the frames is usually not perfectly circular. Accordingly, the whalebone must be deformed slightly during installation and this may result in a poor fit when panels are attached. Also, the appearance of the ceiling is degraded somewhat along the gap between adjacent panels because the bulb seals are visible from the cabin interior. An additional problem presented by the old panel design is the difficulty in removing the panel for maintenance or servicing. Use of retaining clips provides for relatively easy installation of the panels but it is sometimes rather difficult to unhook the clips from the whalebone.

The disclosed ceiling panel assembly was conceived in an effort to alleviate some of the above-described problems. Accordingly, it is an object of this invention to provide a ceiling panel assembly which provides for relatively easy removal as well as installation of individual panel sections.

Another object of this invention is to provide a ceiling panel assembly having fewer parts and having parts which are simpler to manufacture and assemble than those known in the art.

Another object of this invention is to provide a ceiling panel assembly in which the individual panels have a greater degree of adjustability with respect to supporting structure than previously known assemblies have.

A further object of this invention is to provide for a ceiling panel assembly for an aircraft interior which is lighter in weight than those previously known.

SUMMARY OF THE INVENTION

In summary, the disclosed invention may be broadly described as a ceiling panel assembly which includes a plurality of ceiling panels, support brackets mounted near the edges of the panels for attaching them to supporting structure, gap cover guides attached near the edges of the panels, and gap covers for covering the gap between adjacent panel sections which are guided and held in place by the gap cover guides.

BRIEF DESCRIPTION OF THE DRAWINGS

FIG. 1 shows an isometric view, partially in section, of a portion of a ceiling panel assembly known in the prior art.

FIG. 3 shows a bottom view seen from the cabin interior of a portion of the disclosed ceiling panel assembly near the intersection of two adjacent panels.

FIG. 4 shows a top view, or a view from the outside of the cabin, of the disclosed ceiling panel assembly.

FIG. 5 shows an isometric view, partially in section, of the panel assembly taken at 5—5 of FIG. 4.

FIG. 6 shows another isometric view, partially in section, of the panel assembly taken at 6—6 in FIG. 4.

FIG. 7 shows an isometric view of a support bracket assembly and a portion of the fuselage frame to which it is attached.

FIG. 8 shows an exploded view of the same support bracket assembly.

DETAILED DESCRIPTION OF THE DRAWINGS

Figure 2:
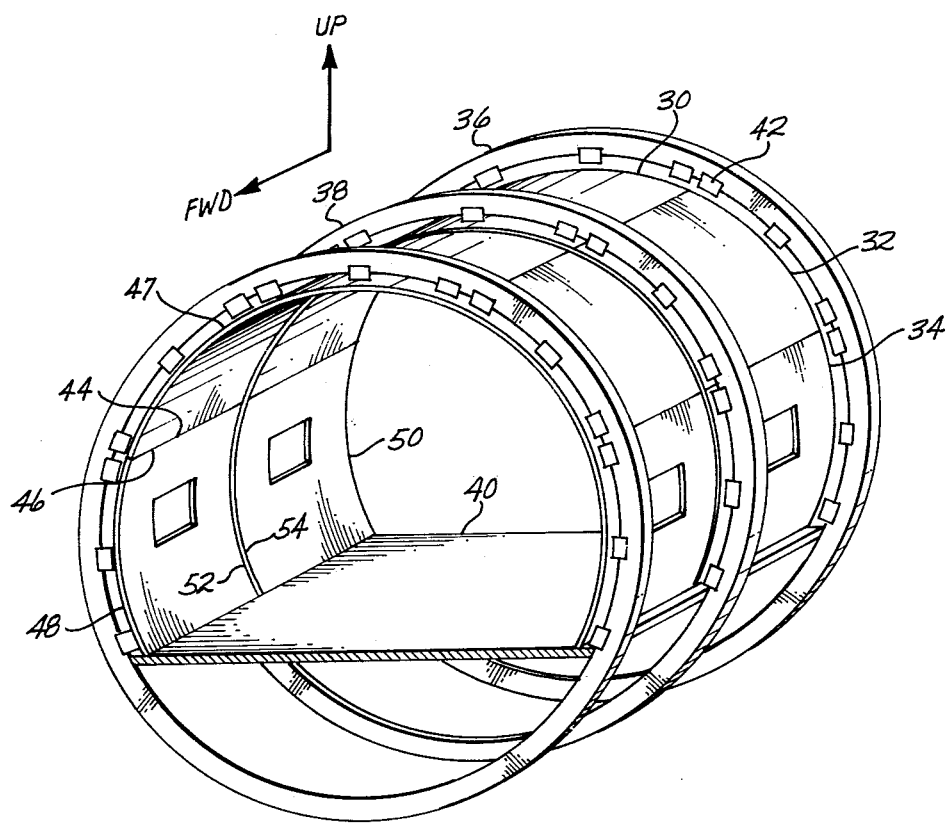
FIG. 2 is a simplified isometric view of a portion of a typical aircraft fuselage in which the ceiling panels have been installed.

FIG. 2 shows a simplified view of a section of a fuselage of a typical commercial aircraft in which the disclosed ceiling panels may be used. For simplicity, all longitudinal structural members have been removed. It can be seen that typical ceiling panels 30, 32 and 34 are located within fuselage frames 36 and 38 and above main deck 40 and are attached to the frames by means of a number of adjustable attachment brackets 42 which will be later described in detail. The panels form the interior walls and ceiling of the aircraft cabin as viewed by the passengers and may contain suitable cutouts to expose windows, cabin lights and so forth. They may also be suitably shaped to accomodate various accomodations such as luggage racks and passenger oxygen equipment.

The panels of the preferred embodiment are made of compression molded fiberglass although various other materials could be used. As with panels known in the prior art, the circumferentially adjacent edges of the disclosed panels, such as edges 44 and 46 of panels 47 and 48, respectively, are joined together by some sort of interlocking construction such as a tongue-in-groove design. The adjoining edges of longitudinally adjacent panels 48 and 50, that is, edges 52 and 54 do not touch but are separated by a small gap. As has been previously mentioned, it is an object of this invention to provide a convenient and attractive means for attaching these panels to the airframe along these edges and for covering this gap.

From FIG. 2 it can be seen that each of the panel sections has two opposing edges which are curved to match the contours of the frames and two other opposing edges which are approximately straight. For convenience in referring to the various edges of a particular panel, an edge will occasionally be referred to herein as a "straight" edge or a "curved" edge. In FIGS. 3 and 4 a portion of two longitudinally adjacent panels 48 and 50 is shown in an area near their adjacent curved edges 52 and 54, respectively, as viewed from inside the fuselage. In FIG. 4, the same area of these edges is shown as viewed from outside the fuselage. Running parallel to the curved edges of each panel is a reinforcement flange 56 to provide additional rigidity for the panel.

Also, located along each curved edge are a number of reinforced areas 58, each of which provides a base for the mounting of an attachment bracket 60. Two threaded inserts 62 are bonded within each of these reinforced areas and receive screws 64 which secure support brackets 60 to the panels. The holes in attachment bracket 60 through which screws 64 pass may be made oversized to allow some degree of adjustability between the bracket and the panel. One arm 66 of each attachment bracket 60 extends beyond the curved edge of the panel to which it is attached and contains a captive screw 68 for securing the bracket to the support bracket assembly (to be described below). In the preferred embodiment, three attachment brackets are mounted at spaced intervals along each curved edge of each panel, but the number used can be varied so as to provide adequate support for panels of different sizes.

Also attached to each curved edge of the panels is a gap cover guide 70 which is a plastic extrusion. In the preferred embodiment, the guide is a single strip which is approximately the length of the curved edge of the panel, but it could be made in a number of separate sections if desired. The guide is inserted between the attachment brackets 60 and the reinforced portion 58 of the panel and bonded to the panel in between the bracket locations. Referring to FIG. 6, it can be seen that lip 72 of the guide is continuously bonded to the upper surface of the panel at area 74.

An alternate design for the guides which would eliminate the necessity of bonding involves extending the flat portion 76 completely underneath brackets 60 and drilling holes in each extended portion through which screws 64 can pass. Then the guides can be secured to the panels simply by clamping them between the attachment brackets and reinforced areas 58. Spacers 65 are inserted between the guides and the reinforced areas at the location of screws 64 to provide a small amount of clearance between the guides and the reinforced areas.

To close the gap between adjacent panels, a thin plastic gap cover 78 is inserted between the panel edges and associated gap cover guides as shown in FIGS. 3 through 6. Referring to FIG. 6, it can be seen that the guide is slidably held in place between the upper portion 80 of the guide and the upwardly curved edge 82 of the panel. The guide also passes underneath attachment brackets 60 between gap cover guides 76 and the reinforced area of the panel 58, as shown in FIG. 5, but because of the clearance provided by spacer 65 it is free to slide in that area. Each guide is approximately equal in length to the curved edge of the panel and can be easily inserted or removed from either end of the panel.

The panels are attached to the fuselage frames with a number of support bracket assemblies 84, one of which is illustrated in FIGS. 7 and 8. Referring again to FIG. 2, it can be seen that these assemblies are located just above the gaps between the panels, and that each bracket acts as a support for two longitudinally adjacent panels. Each support bracket assembly includes plate 86, two spacers 88, angles 90 and 92, and captive nut clips 94 and 96. In the preferred embodiment, each panel with six attachment brackets 60 mounted thereon is secured to angles 94 of six corresponding support bracket assemblies by means of captive screws 68 and captive nut clips 96. In each assembly 84, captive nut clips 96 are slidably mounted in slot 98 of angle 94. Angles 94 and 96 are jointed by means of machine screws and captive nut clips 94 which are slidably mounted in slots 100. Angle 92 and plate 86 are joined by bolts 102 which pass through slots 104 and 106. Finally, plate 86, with spacers 88 attached, is fastened to lower frame cord 108 and frame 110 by bolt 112.

During installation of the ceiling panels, support bracket assemblies 84 are mounted on the frame with the parts loosely assembled so that each bracket can be adjusted as necessary when the ceiling panels are placed in position. The panels may be adjusted fore and aft in the fuselage because slots 100 permit relative movement in that direction of angle 90 with respect to angle 92. The panels can be adjusted circumferentially because clips 96 can slide in slot 98 of angle 90 and because slot 104 permit relative movement of angle 92 with respect to the frame. In addition, radial adjustment of the panels (with respect to the fuselage centerline) is accomplished by moving angle 92 with respect to plate 86 as permitted by slots 106. In should be noted here that the purpose of spacers 88 is to provide sufficient clearance between plate 86 and frame lower cord 108 to clear the heads of bolts 102.

After the ceiling panels have been installed and the various fasteners of the support bracket assembly tightened, gap covers 78 can be slid in place to complete the installation. If it becomes necessary to later remove one of the panels, this is accomplished quite easily by simply removing the gap covers on either side and loosening the captive screws 68 which hold the panel in place.

Thus, it can be seen that this invention provides for a ceiling panel assembly which can be quickly installed or removed and which has three degrees of adjustability with respect to the aircraft fuselage. Although only one specific embodiment of this invention has been illustrated and described (except for the gap cover guide for which a second embodiment has been suggested), it is to be understood that obvious modifications may be made of them without departing from the true spirit and scope of this invention.

What is claimed is:

1. A ceiling panel assembly adapted to be attached to a supporting structure comprising:
    a plurality of ceiling panels having gaps therebetween and each panel having a plurality of edges;
    gap cover guides attached to the panels near the edges;
    gap covers extending between the guides on adjoining panels and urged into contact with the panels by the guides; and,
    attachment brackets mounted near the edges of the panels for attaching the panels to the supporting structure at points in between said panels and above said gap covers.

2. A ceiling panel assembly comprising in combination:
    a plurality of ceiling panels, each having a plurality of edges;
    gap cover guides attached to the panels near the edges;
    a gap cover extending between the said guides on adjoining panels and urged into contact with the panels by the guides;
    an adjustment bracket assembly mounted to supporting structure; and,
    attachment brackets mounted near the edges of the panels for attaching the panels to the adjustment bracket assembly.

3. The assembly of claim 2 wherein said gap cover guides are attached to the panels intermediate the attachment brackets.

4. The assembly of claim 2 wherein said gap cover guides are clamped to the surface of an associated panel by an attachment bracket.

5. A ceiling panel assembly comprising:
    a plurality of ceiling panels, each panel including:
        a plurality of spaced attachment brackets mounted near and extending beyond the edge of the panel for adjustably securing the panel to supporting structure:
        a gap cover guide attached near and parallel to an edge of the panel;
        a gap cover extending between adjacent panels and slidably held between the gap cover guide and the panel, the gap cover being urged into contact with said panel by the gap cover guide; and,
        an adjustment bracket assembly to which one or more attachment brackets are fastened for providing 3° of adjustment between the panel and the supporting structure, said adjustment bracket being fixedly mounted to the supporting structure.

6. The device of claim 5 wherein said gap cover guide is attached to the panel intermediate a pair of attachment brackets.

7. The device of claim 5 wherein said gap cover guide is held to the panel by an attachment bracket.

8. In combination with an interior ceiling structure for use in the passenger cabin in an aircraft including a plurality of curved ceiling panels each having an upper and lower surface and supporting structure to which the ceiling is attached, the improvement comprising means for closing the gap between adjacent panels and for adjustably attaching the panels to the supporting structure including:
    an adjustment bracket assembly fixedly mounted to the supporting structure for providing 3° of adjustment between a panel and the supporting structure;
    a plurality of spaced attachment brackets mounted to the upper surfaces and near adjoining edges of the panels for securing the panels to the adjustment bracket assembly;
    gap cover guides attached to the upper surfaces of the panels near the edges thereof; and
    gap cover strips extending between and overlapping adjacent edges of the panels and slidably mounted between the gap cover guides and the upper surfaces of the panels, the gap covers being urged into contact with said upper panel surfaces by the guides.

* * * * *